United States Patent [19]
Leith

[11] Patent Number: 5,899,120
[45] Date of Patent: May 4, 1999

[54] CRANKSHAFT WITH LAMINATED COUNTERWEIGHT

[75] Inventor: Donald G. Leith, West Bloomfield, Mich.

[73] Assignee: Panther Machine, Inc., Wixom, Mich.

[21] Appl. No.: 08/859,611

[22] Filed: May 20, 1997

[51] Int. Cl.[6] .............................. F16C 3/04; F16H 53/00
[52] U.S. Cl. .................. 74/603; 74/567; 74/445
[58] Field of Search ............................ 74/445, 449, 567, 74/569, 603

[56] References Cited

U.S. PATENT DOCUMENTS

| | | | |
|---|---|---|---|
| 1,261,053 | 4/1918 | O'Brien . | |
| 1,928,245 | 9/1933 | Bloss et al. ............................... | 74/71 |
| 2,516,365 | 7/1950 | Carraher .................................. | 74/449 |
| 3,590,208 | 6/1971 | Martini et al. .......................... | 219/92 |
| 4,046,028 | 9/1977 | Vachris .................................... | 74/597 |
| 4,342,236 | 8/1982 | Everts ...................................... | 74/603 |
| 4,522,080 | 6/1985 | Santi ........................................ | 74/445 |
| 4,630,498 | 12/1986 | Santi ........................................ | 74/445 |

FOREIGN PATENT DOCUMENTS

| | | | |
|---|---|---|---|
| 158581 | 12/1939 | Germany ................................. | 74/567 |
| 57-6153 | 1/1982 | Japan ....................................... | 74/567 |
| 238672 | 8/1925 | United Kingdom ..................... | 74/567 |

*Primary Examiner*—Vinh T. Luong
*Attorney, Agent, or Firm*—Gifford, Krass, Groh, Sprinkle, Patmore, Anderson & Citkowski, P.C.

[57] ABSTRACT

A laminated counterweight for connecting the main shaft with the crankpin of a crankshaft in which the counterweight includes a pair of end laminations which are circular in shape and have a central opening dimensioned to receive the main shaft and a crankpin opening radially spaced from the central opening and dimensioned to receive the crankpin. A plurality of central laminations is sandwiched in between the end laminations. Each central lamination, like the end laminations, includes a central opening dimensioned to receive the main shaft as well as a crankpin opening dimensioned to receive the crankpin. A pair of cutouts is provided through each central lamination and, said cutouts being disposed on opposite sides of the radius extending between the central opening and the crankpin opening.

3 Claims, 1 Drawing Sheet

U.S. Patent      May 4, 1999      5,899,120
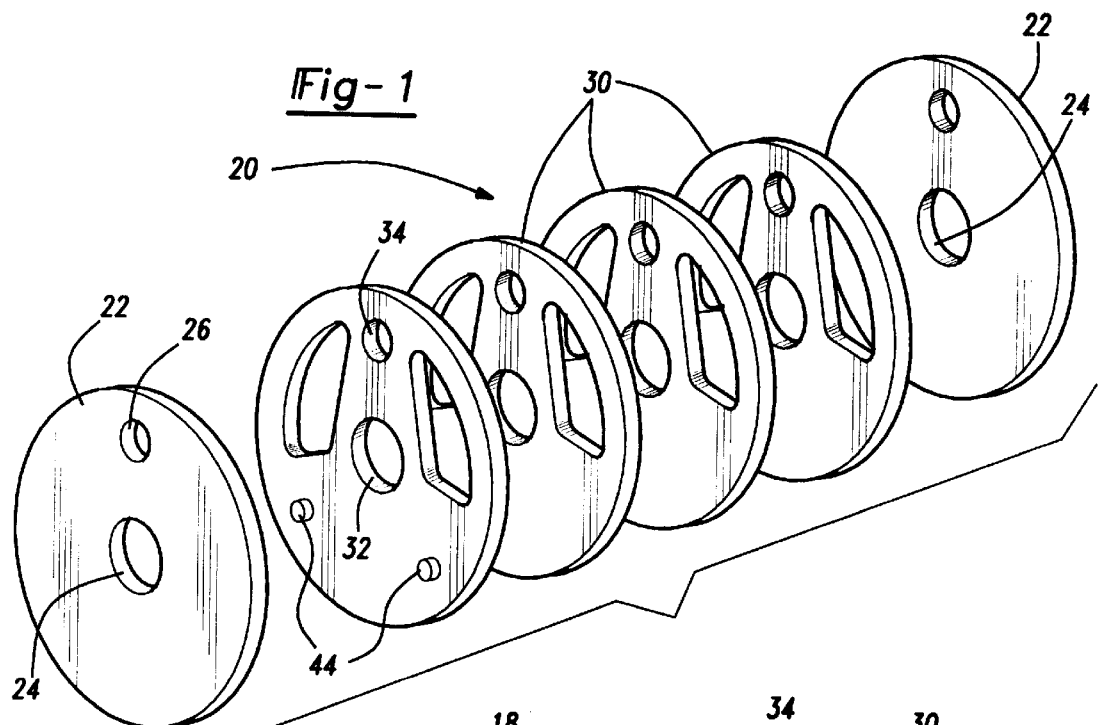
Fig-1
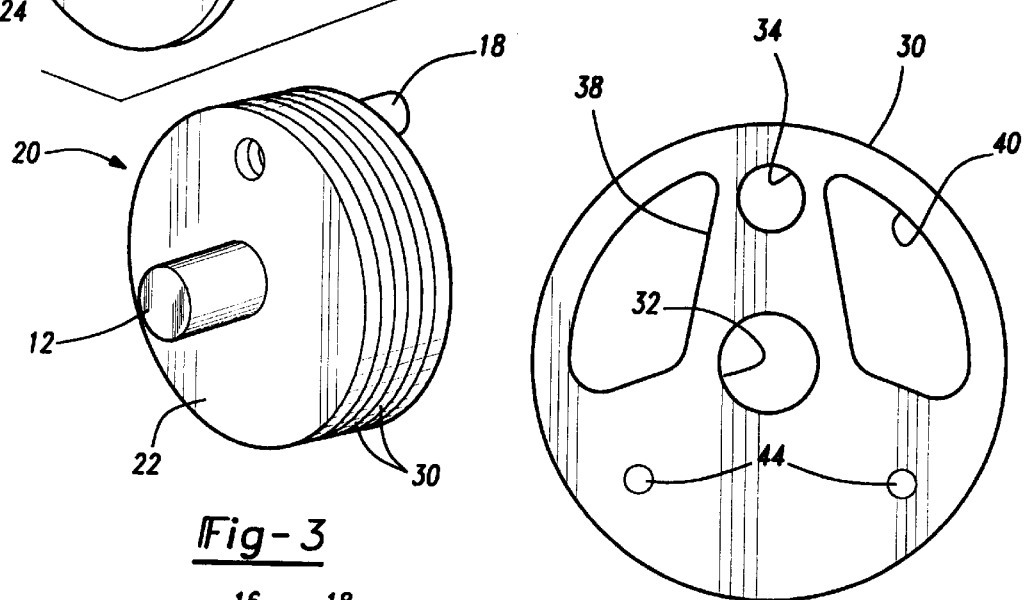
Fig-3
Fig-2
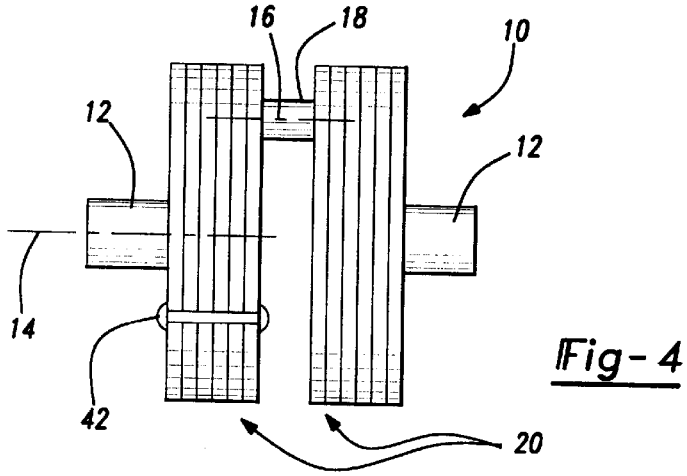
Fig-4

CRANKSHAFT WITH LAMINATED COUNTERWEIGHT

BACKGROUND OF THE INVENTION

I. Field of the Invention

The present invention relates generally to a crankshaft with a counterweight and, more particularly, to such a crankshaft with a laminated counterweight.

II. Description of the Prior Art

In a conventional crankshaft, the crankshaft includes a segmented main shaft having an axis aligned with the axis of rotation of the crankshaft. One or more crankpins are also provided at a position radially spaced but parallel to the main shaft. A piston is then secured to each crankpin in order to rotatably drive the crankshaft about its axis of rotation.

Since the crankpins are radially offset from the axis of rotation of the crankshaft, counterweights are conventionally provided for securing the main shaft to the crankpins so that the overall crankshaft has a balanced rotation. Such counterweights are typically made of a single heavy body of metal which is machined so that the crankshaft, including the main shaft segments and crankpins, is of a one-piece construction. Machining such crankshafts, however, is necessarily expensive which increases the overall cost of the crankshaft.

There have, however, been previously known crankshafts which utilize laminated counterweights so that the overall crankshaft is of a multi-piece construction. Such a laminated counterweight, which reduces the overall cost of the crankshaft, is disclosed in U.S. Pat. No. 4,342,236 to Everts which issued on Aug. 3, 1982.

These previously known crankshafts with laminated counterweights, however, merely duplicate the shape of the counterweight with the laminations. As such, the laminations are substantially triangular in shape with an opening for the main shaft segment extending through the center of the triangle and an opening for the crankpin provided at an apex of the triangle.

Since these previously known crankshafts with laminated counterweights merely duplicate the overall shape of the conventional one-piece counterweight, the volume of the crankcase for the engine remains substantially the same regardless of whether a one-piece counterweight is used or a laminated counterweight is used. Furthermore, reduction in the overall volume of the crankcase would advantageously result in the overall reduction of emissions of noxious fumes from the engine, especially for two-cycle engines.

SUMMARY OF THE PRESENT INVENTION

The present invention provides a laminated counterweight for a crankshaft which is not only inexpensive and effective in operation, but also effectively reduces the crankcase volume.

In brief, the counterweight of the present invention comprises a pair of circular end laminations. Each end lamination includes a central opening dimensioned to receive the main shaft segment therethrough. Each end lamination further includes a crankpin opening radially spaced from the central opening and dimensioned to receive the crankpin.

A plurality of central laminations is then sandwiched in between the end laminations. Each central lamination includes a central opening which is dimensioned to receive the main shaft and a crankpin opening which is dimensioned to receive the crankpin. When the central laminations are sandwiched in between the end laminations, the central openings through all of the laminations register with each other and, likewise, the crankpin openings through all of the laminations also register with each other.

In order to provide the counterweight function while maintaining an outer cylindrical shape for the counterweight, each central lamination includes a pair of cutouts. One cutout is disposed on each side of a radius extending between the central opening and crankpin opening of the central laminations. By thus reducing the weight of each central lamination in the area between the crankpin opening and the central opening, the weight of the counterweight is effectively increased in the area of the counterweight diametrically opposed from the crankpin.

Since the overall outer shape of the counterweight is cylindrical, however, the counterweight of the present invention effectively reduces the volume of the crankcase. This in turn reduces the emissions of noxious fumes from the engine, especially for two-cycle engines.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an exploded elevational view illustrating a preferred embodiment of the counterweight of the present invention;

FIG. 2 is a plan view illustrating one central lamination of the preferred embodiment of the present invention;

FIG. 3 is an elevational view illustrating the assembled counterweight of the present invention; and FIG. 4 is a side view illustrating a portion of a crankshaft utilizing the improved counterweight of the present invention.

DETAILED DESCRIPTION OF A PREFERRED EMBODIMENT OF THE PRESENT INVENTION

With reference first to FIG. 4, a portion of a crankshaft 10 is there shown having a segmented main shaft 12 adapted to rotate about its axis 14. The crankshaft 10 also includes one or more crankpins 18 each having an axis 16 which is parallel to, but radially spaced from, the axis 14 of the main shaft 12.

With reference then to FIGS. 1–3, a preferred embodiment of the counterweight 20 of the present invention is there shown for connecting the crankpin 18 to the main shaft 12. The counterweight 20 comprises a pair of end laminations 22 which are circular in shape and preferably comprise a metal stamping for low cost. Each end lamination 22 includes a central opening 24 provided concentrically through the end laminations 22 and dimensioned to receive the main shaft 12 therein. Similarly, a crankpin opening 26 is provided through each end lamination 22 which is radially spaced from the central opening 24. The crankpin opening 26, furthermore, is dimensioned to receive the crankpin 18 therein.

With reference now to FIGS. 1 and 2, the counterweight 20 further comprises a plurality of central laminations 30 which are also generally circular in shape and also preferably metal stampings. Each central lamination 30, like the end laminations 22, includes a central opening 32 dimensioned to receive the main shaft 12 as well as a second crankpin opening 34 radially spaced from the central opening 32 and dimensioned to receive the crankpin 18 therein.

The central laminations 30 are sandwiched in between the end laminations 22 as best shown in FIG. 3. In doing so, the openings 24 and 32 all register with each other and, similarly, the openings 26 and 34 also register with each other. The main shaft 12 is then positioned through the registering openings 24 and 32 and, similarly, the crankpin 18 is provided through the registering openings 34 and 26. Furthermore, the main shaft 12 and crankpin 18 are secured to the counterweight 20 in any conventional fashion.

With reference now particularly to FIG. 2, unlike the end laminations, the central lamination includes a pair of cutouts 38 and 40. The cutouts 38 and 40 are provided on opposite sides of a radius 41 extending between the central opening 32 and crankpin opening 34. The cutouts 38 and 40 thus effectively decrease the weight of the central laminations 30 on the side of each central lamination 30 between the main shaft 12 and crankpin 18 (FIG. 3). Simultaneously, the weight of the counterweight 20 is effectively increased on its half diametrically opposed from the crankpin opening 34.

With the central laminations 30 sandwiched between the end laminations 22, the cutouts 38 and 40 also register with each other. In doing so, the registering cutouts 38 and 40 form closed chambers within the interior of the counterweight 20.

As best shown in FIG. 3, with the central laminations 30 sandwiched in between the end laminations 22, the overall shape of the counterweight 20 is effectively cylindrical. Despite the cylindrical shape, however, the counterweight 20 still functions as a counterweight since the weight of the counterweight 20 is greater on its half diametrically opposed from the crankpin 18. However, since the counterweight 20 is cylindrical in shape, the counterweight 20 effectively decreases the overall volume of the engine crankcase (not shown).

Any conventional means can be employed to secure the laminations 22 and 30 together to prevent the laminations 22 and 30 from sliding, both laterally and axially, relative to each other. For example, one or more fasteners 42 (FIG. 4), such as a rivet, may be provided through the laminations 22 and 30. Optionally, the laminations 22 and 30 may include recesses 45 (FIG. 1) on one side which form a protrusions 44 on the other side so that the protrusions on one lamination nest into and mechanically lock with the recesses on the adjacent lamination.

Any other means may alternatively be used to mechanically lock the laminations 22 and 30 together.

From the foregoing, it can be seen that the present invention provides a multi-piece crankshaft having one or more laminated counterweights. Furthermore, since the counterweights are cylindrical in shape, the counterweights effectively reduce the overall volume of the crankcase thus effectively reducing noxious emissions, especially for two-cycle engines.

Having described our invention, however, many modifications thereto will become apparent to those skilled in the art to which it pertains without deviation from the spirit of the invention as defined by the scope of the appended claims.

I claim:

1. A counterweight for a crankshaft comprising a main shaft aligned with an axis of rotation of the crankshaft, and a crankpin parallel to but offset from the main shaft, said counterweight connecting the main shaft to the crankpin and said counterweight comprising:

a pair of end laminations, each end lamination comprising a circular plate having only a central opening dimensioned to receive the main shaft therein and a crankpin opening radially spaced from said central opening and dimensioned to receive the crankpin therein, a plurality of central laminations sandwiched in between said end laminations, each central lamination having a central opening dimensioned to receive the main shaft therethrough and a crankpin opening dimensioned to receive the crankpin therethrough, wherein said central laminations each further include a pair of cutouts, said cutouts being disposed on opposite sides of a radius extending between said central opening and said crankpin opening, wherein registering cutouts on said central laminations form two chambers in the counterweight, said chambers being closed on each end by said end laminations.

2. The invention as defined in claim 1 wherein said central laminations and said end laminations each comprise a metal stamping.

3. The invention as defined in claim 1 wherein each central lamination and each end lamination comprises at least one offset portion which forms a recess on one side of each lamination and a corresponding protrusion on the opposite side of each lamination, said protrusion on each lamination nesting within the recess on the adjacent lamination to lock said laminations together against lateral movement.

* * * * *